(12) United States Patent
Zaslavsky et al.

(10) Patent No.: US 11,640,665 B2
(45) Date of Patent: May 2, 2023

(54) METHODS AND APPARATUSES FOR DETECTING DEGRADED ULTRASOUND IMAGING FRAME RATES

(71) Applicant: BFLY Operations, Inc., Guilford, CT (US)

(72) Inventors: Maxim Zaslavsky, San Diego, CA (US); Krishna Ersson, Guilford, CT (US); Vineet Shah, Jersey City, NJ (US); Abraham Neben, Guilford, CT (US); Benjamin Horowitz, Guilford, CT (US); Renee Esses, Guilford, CT (US); Kirthi Bellamkonda, New Haven, CT (US)

(73) Assignee: BFLY OPERATIONS, INC., Burlington, MA (US)

( * ) Notice: Subject to any disclaimer, the term of this patent is extended or adjusted under 35 U.S.C. 154(b) by 334 days.

(21) Appl. No.: 17/033,298

(22) Filed: Sep. 25, 2020

(65) Prior Publication Data
US 2021/0097689 A1 Apr. 1, 2021

Related U.S. Application Data

(60) Provisional application No. 62/907,520, filed on Sep. 27, 2019.

(51) Int. Cl.
*G06T 7/00* (2017.01)
*G01S 15/89* (2006.01)
*G01S 7/52* (2006.01)

(52) U.S. Cl.
CPC ........ *G06T 7/0014* (2013.01); *G01S 7/52004* (2013.01); *G01S 15/89* (2013.01);
(Continued)

(58) Field of Classification Search
None
See application file for complete search history.

(56) References Cited

U.S. PATENT DOCUMENTS

| 6,473,659 B1 * | 10/2002 | Shah | G06F 11/2252 |
| | | | 702/179 |
| 2004/0044283 A1 * | 3/2004 | Yoneyama | G01S 7/52085 |
| | | | 600/437 |

(Continued)

FOREIGN PATENT DOCUMENTS

WO WO 2017/222964 A1 12/2017

OTHER PUBLICATIONS

International Preliminary Report on Patentability issued in corresponding International Application No. PCT/US2020/052682; dated Mar. 15, 2022 (6 pages).

(Continued)

*Primary Examiner* — Michelle M Entezari
(74) *Attorney, Agent, or Firm* — Osha Bergman Watanabe & Burton LLP

(57) ABSTRACT

Aspects of the technology described herein relate to detecting degrade ultrasound imaging frame rate. Some embodiments include receiving ultrasound data from the ultrasound device, generating ultrasound images from the ultrasound data, taking one or more measurements of ultrasound imaging frame rate based on the ultrasound images, comparing the one or more measurements of ultrasound imaging frame rate to an reference ultrasound imaging frame rate value, and based on a result of comparing the one or more measurements of ultrasound imaging frame rate to the reference ultrasound imaging frame rate value, providing a notification and/or disabling an ultrasound imaging preset and/or an ultrasound imaging mode with which the ultrasound device was configured.

20 Claims, 2 Drawing Sheets

(52) U.S. Cl.
CPC .............. *G06T 2207/10132* (2013.01); *G06T 2207/30168* (2013.01)

(56) References Cited

U.S. PATENT DOCUMENTS

| | | | | |
|---|---|---|---|---|
| 2007/0156285 | A1* | 7/2007 | Sillman | A61B 34/70 700/251 |
| 2008/0130737 | A1* | 6/2008 | Kamariotis | H04N 21/4305 375/E7.157 |
| 2011/0055447 | A1 | 3/2011 | Costa | |
| 2011/0121969 | A1* | 5/2011 | Mercer | G08B 21/185 340/540 |
| 2011/0306893 | A1* | 12/2011 | Harrold | A61B 5/1118 600/595 |
| 2012/0136252 | A1* | 5/2012 | Cho | G01S 7/52023 600/443 |
| 2015/0051489 | A1* | 2/2015 | Caluser | A61B 8/5207 600/440 |
| 2015/0379736 | A1* | 12/2015 | Thosar | A61B 8/06 382/131 |
| 2017/0143306 | A1 | 5/2017 | Rothberg et al. | |
| 2017/0244991 | A1* | 8/2017 | Aggarwal | G06V 40/23 |
| 2017/0360397 | A1 | 12/2017 | Rothberg et al. | |
| 2017/0360401 | A1 | 12/2017 | Rothberg et al. | |
| 2017/0360412 | A1 | 12/2017 | Rothberg et al. | |
| 2018/0070924 | A1* | 3/2018 | Kawabata | G01S 15/89 |
| 2018/0284250 | A1* | 10/2018 | Bjaerum | G01S 7/52085 |
| 2019/0261957 | A1 | 8/2019 | Zaslavsky et al. | |
| 2019/0350563 | A1* | 11/2019 | Omero | H04N 21/2187 |
| 2020/0046314 | A1 | 2/2020 | Neben et al. | |
| 2020/0069291 | A1 | 3/2020 | Zaslavsky | |
| 2020/0129151 | A1 | 4/2020 | Neben et al. | |
| 2020/0214672 | A1 | 7/2020 | de Jonge et al. | |
| 2020/0214682 | A1 | 7/2020 | Zaslavsky et al. | |
| 2020/0253585 | A1 | 8/2020 | Neben et al. | |
| 2020/0287993 | A1* | 9/2020 | Schweizer | H04L 43/0864 |
| 2021/0209734 | A1* | 7/2021 | Simhadri | G06N 3/045 |

OTHER PUBLICATIONS

International Search Report and Written Opinion dated Dec. 31, 2020 in connection with International Application No. PCT/US2020/052682.

* cited by examiner

METHODS AND APPARATUSES FOR DETECTING DEGRADED ULTRASOUND IMAGING FRAME RATES

CROSS-REFERENCE TO RELATED APPLICATIONS

The present application claims the benefit under 35 U.S.C. § 119(e) of U.S. Patent Application Ser. No. 62/907,520, filed Sep. 27, 2019, and entitled "METHODS AND APPARATUSES FOR DETECTING DEGRADED ULTRASOUND IMAGING FRAME RATES," which is hereby incorporated by reference herein in its entirety.

FIELD

Generally, the aspects of the technology described herein relate to collection of ultrasound images. Certain aspects relate to detecting degraded ultrasound imaging frame rate.

BACKGROUND

Ultrasound devices may be used to perform diagnostic imaging and/or treatment, using sound waves with frequencies that are higher than those audible to humans. Ultrasound imaging may be used to see internal soft tissue body structures. When pulses of ultrasound are transmitted into tissue, sound waves of different amplitudes may be reflected back towards the probe at different tissue interfaces. These reflected sound waves may then be recorded and displayed as an image to the operator. The strength (amplitude) of the sound signal and the time it takes for the wave to travel through the body may provide information used to produce the ultrasound image. Many different types of images can be formed using ultrasound devices. For example, images can be generated that show two-dimensional cross-sections of tissue, blood flow, motion of tissue over time, the location of blood, the presence of specific molecules, the stiffness of tissue, or the anatomy of a three-dimensional region.

SUMMARY

According to one aspect of the application, a method includes receiving, by a processing device in operative communication with an ultrasound device, ultrasound data from the ultrasound device; generating ultrasound images from the ultrasound data; taking one or more measurements of ultrasound imaging frame rate based on the generation of the ultrasound images; comparing at least a first measurement of ultrasound imaging frame rate of the one or more measurements of ultrasound imaging frame rate to a reference ultrasound imaging frame rate value; and based on a result of comparing at least the first measurement of ultrasound imaging frame rate of the one or more measurements of ultrasound imaging frame rate to the reference ultrasound imaging frame rate value, providing a notification and/or disabling an ultrasound imaging preset and/or an ultrasound imaging mode with which the ultrasound device was configured during collection of the ultrasound data.

In some embodiments, the processing device comprises a smartphone. In some embodiments, the processing device comprises a tablet.

In some embodiments, taking the one or more measurements of ultrasound imaging frame rate based on the generation of the ultrasound images comprises determining how many ultrasound images the processing device generated during a time period. In some embodiments, taking the one or more measurements of ultrasound imaging frame rate based on the generation of the ultrasound images comprises determining how many ultrasound images the processing device generated during multiple time periods. In some embodiments, the multiple time periods are successive. In some embodiments, the multiple time periods are overlapping. In some embodiments, the multiple time periods are not consecutive. In some embodiments, the multiple time periods have different lengths. In some embodiments, the multiple time periods have the same lengths.

In some embodiments, the reference frame rate value is based at least in part on the ultrasound imaging preset and/or the ultrasound imaging mode with which the ultrasound device is configured. In some embodiments, the reference frame rate value is based at least in part on ultrasound wave transmission timings and/or processing times of processing circuitry in the ultrasound device.

In some embodiments, comparing at least the first measurement of ultrasound imaging frame rate of the one or more measurements of ultrasound imaging frame rate to the reference ultrasound imaging frame rate value comprises determining if at least one of the measurements of frame rate is less than the reference frame rate value by a threshold amount. In some embodiments, comparing at least the first measurement of ultrasound imaging frame rate of the one or more measurements of ultrasound imaging frame rate to the reference ultrasound imaging frame rate value comprises determining if at least a specific portion of a specific number of consecutive measurements of frame rate are less than the reference frame rate value by a threshold amount. In some embodiments, comparing at least the first measurement of ultrasound imaging frame rate of the one or more measurements of ultrasound imaging frame rate to the reference ultrasound imaging frame rate value comprises determining if an average of the one or more measurements of frame rate is less than the reference frame rate value by a threshold amount. In some embodiments, the threshold amount is based at least in part on the ultrasound imaging preset and/or the ultrasound imaging mode with which the ultrasound device is configured.

In some embodiments, the notification includes a notification that imaging performance is degraded. In some embodiments, the notification includes a notification that the processing device does not support the ultrasound device's peak performance capability. In some embodiments, the notification includes a notification that a user may experience degraded imaging frame rate and certain imaging modes may be disabled. In some embodiments, the notification includes a notification that a user should contact customer support. In some embodiments, the notification includes a notification that imaging performance degradation is due to the ultrasound device and not the processing device.

Some aspects include an apparatus configured to perform the above aspects and embodiments. Some aspects include at least one non-transitory computer-readable storage medium storing processor-executable instructions that, when executed by at least one processor, cause the at least one processor to perform the above aspects and embodiments.

BRIEF DESCRIPTION OF THE DRAWINGS

Various aspects and embodiments will be described with reference to the following exemplary and non-limiting figures. It should be appreciated that the figures are not necessarily drawn to scale. Items appearing in multiple figures are indicated by the same or a similar reference number in all the figures in which they appear.

DETAILED DESCRIPTION

Recently, ultrasound devices have been developed that are capable of receiving commands from, and transmitting ultrasound data to, processing devices such as smartphones, tablets, and laptops. The ultrasound device may generate raw acoustical data or scanlines from the raw acoustical data, and then transmit this data to the processing device, which may then perform processing steps to generate ultrasound images from the received data. The processing device may be configured to generate the ultrasound images at a particular frame rate (i.e., number of ultrasound images per unit time) based on one or more of various factors. For example, the processing device may be configured to generate the ultrasound images at a particular frame rate based on an ultrasound imaging mode of the ultrasound device and/or, when the ultrasound device is being used to image a body (e.g., a patient), based on the part of the body being imaged.

The inventors have recognized that certain processing devices may not have the capability of generating ultrasound images at a target or selected frame rate. For example, certain processing devices with older batteries may have their performance capabilities throttled by their operating systems. Thus, while the processing device may be configured to generate ultrasound images at one frame rate, the processing device may actually generate ultrasound images at a lower frame rate. The inventors have recognized that it may be helpful to notify a user that ultrasound imaging is not being performed with the expected frame rate value. In some embodiments, a user may be notified that the reason for the performance degradation may be the user's processing device, and not the ultrasound device. Such a notification may be helpful, for example, such that a user may know that the processing device, rather than the ultrasound device, may need to be replaced.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Figure 1:
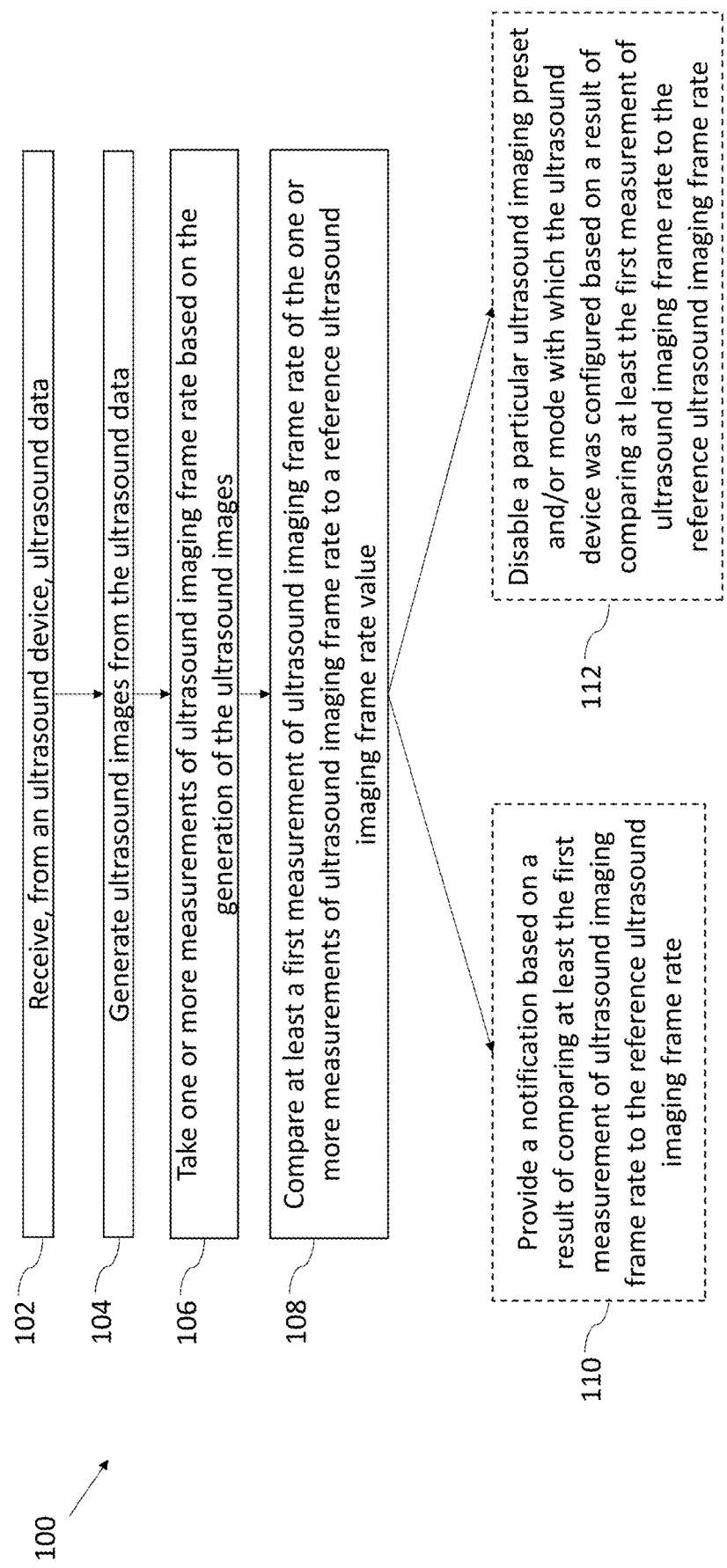
FIG. 1 illustrates a process for detecting degraded ultrasound imaging frame rate, in accordance with certain embodiments described herein.

FIG. 1 illustrates a process 100 for detecting degraded ultrasound imaging frame rate, in accordance with certain embodiments described herein. The process 100 is performed by a processing device in operative communication with an ultrasound device. The processing device may be, for example, a mobile phone, tablet, or laptop in operative communication with an ultrasound device. The ultrasound device and the processing device may communicate over a wired communication link (e.g., over Ethernet, a Universal Serial Bus (USB) cable or a Lightning cable) or over a wireless communication link (e.g., over a BLUETOOTH, WiFi, or ZIGBEE wireless communication link).

In act 102, the processing device receives ultrasound data from the ultrasound device. In some embodiments, the ultrasound device may collect raw acoustical data and transmit the raw acoustical data to the processing device. In some embodiments, the ultrasound device may collect raw acoustical data, generate scanlines from the raw acoustical data, and transmit the scanlines to the processing device. The process 100 proceeds from act 102 to act 104.

In act 104, the processing device generates ultrasound images from the ultrasound data (that was received in act 102). In embodiments in which the processing device receives raw acoustical data from the ultrasound device, the processing device may generate scanlines from the raw acoustical data and then generate ultrasound images from the scanlines. In embodiments in which the processing device receives scanlines from the ultrasound device, the processing device may generate ultrasound images from the scanlines. Various processing steps may be performed by the processing device to generate the ultrasound images. The processing may include, for example, scanline formation, multiline compounding, and image formation. The ultrasound images generated by the processing device may constitute a series of ultrasound images each generated at a specific time. The process 100 proceeds from act 104 to act 106.

In act 106, the processing device takes one or more measurements of ultrasound imaging frame rate based on the generation of the ultrasound images (in act 106). For example, in some embodiments, the processing device may determine how many ultrasound images the processing device generated (e.g., from raw acoustical data or from scanlines received from the ultrasound device) during a given time period. For example, the time period may be 1 second. The number of ultrasound images that the processing device determines were generated during a given time period may be a measurement of a frame rate. By determining how many ultrasound images the processing device generated in multiple time periods, the processing device may take multiple measurements of frame rate. In some embodiments, the time periods may be successive. In some embodiments, the time periods may be overlapping (e.g., a moving time window). In some embodiments, the time periods may not be consecutive. In some embodiments, the time periods may have different lengths. For example, if during one 1-second time period, the processing device generated 10 ultrasound images, and during a another 1-second time period, the processing device generated 12 ultrasound images, the processing device may take one measurement of 10 frames/second and another measurement of 12 frames/second. The process 100 proceeds from act 106 to act 108.

In act 108, the processing device compares at least a first measurement of ultrasound imaging frame rate of the one or more measurements of ultrasound imaging frame rate (from act 106) to a reference ultrasound imaging frame rate value. The reference ultrasound imaging frame rate value may be the frame rate at which the processing device would generate ultrasound images absent any frame rate degradation due to the processing device. In some embodiments, the reference frame rate value may be based at least in part on the ultrasound imaging preset and/or the ultrasound imaging mode with which the ultrasound device is configured. The ultrasound imaging preset may include imaging parameter values related to ultrasound wave transmission and reception that have been optimized for imaging particular anatomical regions. For example, there may be abdominal and cardiac presets. Ultrasound imaging modes may include, for example, B-mode, M-mode, etc. A given anatomical region may have different presets for different modes. Certain parameter values specific to the ultrasound imaging preset and/or mode related to ultrasound wave transmission timings, in addition to processing times of processing circuitry in the ultrasound device, may contribute to determining the reference frame rate value.

In some embodiments, the comparing may include determining if at least one of the measurements of frame rate is less than the reference frame rate value by a threshold amount. If at least one of the measurements of frame rate is less than the reference frame rate value by the threshold amount, this may indicate unacceptable degradation in ultrasound image frame rate. In some embodiments, the comparing may include determining if at least a specific portion of a specific number of consecutive measurements of frame rate (e.g., at least 2 out of 3 consecutive measurements of frame rate) are less than the reference frame rate value by a threshold amount. If at least the specific portion of the specific number of consecutive measurements of frame rate are less than the reference frame rate value by the threshold amount, this may indicate unacceptable degradation in frame rate. In some embodiments, the comparing may include determining if the average of the measurements of frame rate is less than the reference frame rate value by a threshold amount. If the average is less than the reference frame rate value by the threshold amount, this may indicate unacceptable degradation in ultrasound image frame rate. Alternatively, other methods for comparing may be used. In some embodiments, the threshold amount may be a certain portion (e.g., one-third) of the reference frame rate value. In some embodiments, the threshold amount may be an absolute frame rate value (e.g., 5 frames/second, 10 frames/second, etc.). In some embodiments, the threshold amount may be different for different ultrasound imaging presets and/or modes. For example, a cardiac B-mode preset may have a lower threshold amount (in other words, the cardiac preset may require that the measured frame rate be closer to the reference frame rate value) than an abdominal B-mode preset. In some embodiments, the comparing may utilize the Western Electric Rule or the Nelson Rules.

Certain ultrasound imaging modes may include imaging with two different frame rates. For example, M-mode may include imaging with an M-mode frame rate and a B-mode frame rate. When the ultrasound device is configured with such a mode, acts 106 and 108 may include take measurements of both frame rates (i.e., one or more frame rates for M-mode and one or more frame rates for B-mode) and determining if either is less than the reference frame rate value by a threshold amount.

As described above with reference to act 108, there are multiple ways to determine that there is an unacceptable degradation in frame rate. If the processing device determines, based on the result of comparing the one or more measurements of frame rate to the reference frame rate value, that there is unacceptable degradation in frame rate, in some embodiments, the process 100 proceeds from act 108 to act 110, and in some embodiments, the process 100 proceeds from act 108 to act 112.

In act 110, the processing device provides a notification based on a result of comparing at least the first measurement of ultrasound imaging frame rate to the reference ultrasound imaging frame rate. The notification may, for example, be displayed on a display screen of the processing device or output by a speaker on the processing device. In some embodiments, the notification may include a notification that imaging performance is degraded. In some embodiments, the notification may include a notification that the user's processing device does not support the ultrasound device's peak performance capability. In some embodiments, the notification may include a notification that the user may experience degraded imaging frame rate and certain imaging modes may be disabled. In some embodiments, the notification may include a notification that the user should contact customer support. In some embodiments, the notification may include a notification that that the imaging performance degradation is due to the ultrasound device and not the processing device. In some embodiments, the user may skip and/or cancel such a notification, and the processing device may then not provide the notification again for the rest of the scan session.

In act 112, the processing device disables the particular ultrasound imaging preset and/or mode with which the ultrasound device was configured based on a result of comparing at least the first measurement of ultrasound imaging frame rate to the reference ultrasound imaging frame rate. In some embodiments, if the processing device determines at act 108 that there is unacceptable degradation in frame rate, the processing device may perform both acts 110 and 112. For example, the processing device may disable the particular ultrasound imaging preset and/or mode with which the ultrasound device was configured and provide a notification about the disabling. In some embodiments, if the processing device determines at act 108 that there is not unacceptable degradation in frame rate, the process 100 may terminate.

Figure 2:
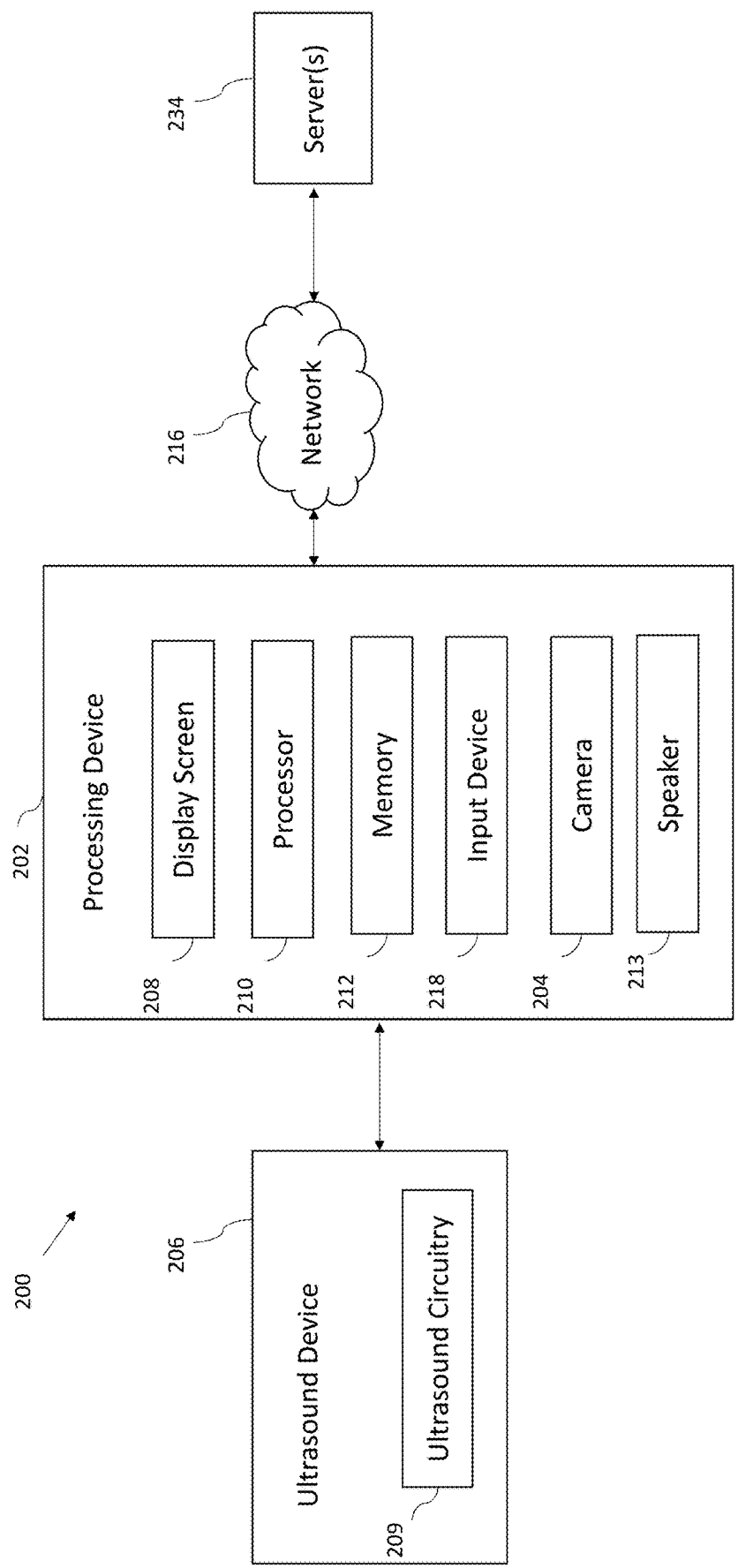
FIG. 2 illustrates a schematic block diagram of an example ultrasound system upon which various aspects of the technology described herein may be practiced.

FIG. 2 illustrates a schematic block diagram of an example ultrasound system 200 upon which various aspects of the technology described herein may be practiced. The ultrasound system 200 includes an ultrasound device 206, a processing device 202, a network 216, and one or more servers 234.

The ultrasound device 206 includes ultrasound circuitry 209. The processing device 202 includes a camera 204, a display screen 208, a processor 210, a memory 212, an input device 218, and a speaker 213. The processing device 202 is in wired (e.g., through a lightning connector or a mini-USB connector) and/or wireless communication (e.g., using BLUETOOTH, ZIGBEE, and/or WiFi wireless protocols) with the ultrasound device 206. The processing device 202 is in wireless communication with the one or more servers 234 over the network 216. However, the wireless communication with the server 234 is optional.

The ultrasound device 206 may be configured to generate ultrasound data that may be employed to generate an ultrasound image. The ultrasound device 206 may be constructed in any of a variety of ways. In some embodiments, the ultrasound device 206 includes a transmitter that transmits a signal to a transmit beamformer which in turn drives transducer elements within a transducer array to emit pulsed ultrasonic signals into a structure, such as a patient. The pulsed ultrasonic signals may be back-scattered from structures in the body, such as blood cells or muscular tissue, to produce echoes that return to the transducer elements. These echoes may then be converted into electrical signals by the transducer elements and the electrical signals are received by a receiver. The electrical signals representing the received echoes are sent to a receive beamformer that outputs ultrasound data. The ultrasound circuitry 209 may be configured to generate the ultrasound data. The ultrasound circuitry 209 may include one or more ultrasonic transducers monolithically integrated onto a single semiconductor die. The ultrasonic transducers may include, for example, one or more capacitive micromachined ultrasonic transducers (CMUTs), one or more CMOS (complementary metal-oxide-semiconductor) ultrasonic transducers (CUTs), one or more piezoelectric micromachined ultrasonic transducers (PMUTs), and/or one or more other suitable ultrasonic transducer cells. In some embodiments, the ultrasonic transducers may be formed the same chip as other electronic components in the ultrasound circuitry 209 (e.g., transmit circuitry, receive circuitry, control circuitry, power management circuitry, and processing circuitry) to form a monolithic ultrasound device. The ultrasound device 206 may transmit ultrasound data and/or ultrasound images to the processing device 202 over a wired (e.g., through a lightning connector or a mini-USB connector) and/or wireless (e.g., using BLUETOOTH, ZIG-BEE, and/or WiFi wireless protocols) communication link.

Referring now to the processing device 202, the processor 210 may include specially-programmed and/or special-purpose hardware such as an application-specific integrated circuit (ASIC). For example, the processor 210 may include one or more graphics processing units (GPUs) and/or one or more tensor processing units (TPUs). TPUs may be ASICs specifically designed for machine learning (e.g., deep learning). The TPUs may be employed to, for example, accelerate the inference phase of a neural network. The processing device 202 may be configured to process the ultrasound data received from the ultrasound device 206 to generate ultrasound images for display on the display screen 208. The processing may be performed by, for example, the processor 210. The processor 210 may also be adapted to control the acquisition of ultrasound data with the ultrasound device 206. The ultrasound data may be processed in real-time during a scanning session as the echo signals are received. In some embodiments, the displayed ultrasound image may be updated a rate of at least 5 Hz, at least 10 Hz, at least 20 Hz, at a rate between 5 and 60 Hz, at a rate of more than 20 Hz. For example, ultrasound data may be acquired even as images are being generated based on previously acquired data and while a live ultrasound image is being displayed. As additional ultrasound data is acquired, additional frames or images generated from more-recently acquired ultrasound data are sequentially displayed. Additionally, or alternatively, the ultrasound data may be stored temporarily in a buffer during a scanning session and processed in less than real-time.

The processing device 202 may be configured to perform certain of the processes (e.g., the process 10) described herein using the processor 210 (e.g., one or more computer hardware processors) and one or more articles of manufacture that include non-transitory computer-readable storage media such as the memory 212. The processor 210 may control writing data to and reading data from the memory 212 in any suitable manner. To perform certain of the processes described herein, the processor 210 may execute one or more processor-executable instructions stored in one or more non-transitory computer-readable storage media (e.g., the memory 212), which may serve as non-transitory computer-readable storage media storing processor-executable instructions for execution by the processor 210. The camera 204 may be configured to detect light (e.g., visible light) to form an image. The camera 204 may be on the same face of the processing device 202 as the display screen 208. The display screen 208 may be configured to display images and/or videos, and may be, for example, a liquid crystal display (LCD), a plasma display, and/or an organic light emitting diode (OLED) display on the processing device 202. The input device 218 may include one or more devices capable of receiving input from a user and transmitting the input to the processor 210. For example, the input device 218 may include a keyboard, a mouse, a microphone, touch-enabled sensors on the display screen 208, and/or a microphone. The display screen 208, the input device 218, the camera 204, and the speaker 213 may be communicatively coupled to the processor 210 and/or under the control of the processor 210.

It should be appreciated that the processing device 202 may be implemented in any of a variety of ways. For example, the processing device 202 may be implemented as a handheld device such as a mobile smartphone or a tablet. Thereby, a user of the ultrasound device 206 may be able to operate the ultrasound device 206 with one hand and hold the processing device 202 with another hand. In other examples, the processing device 202 may be implemented as a portable device that is not a handheld device, such as a laptop. In yet other examples, the processing device 202 may be implemented as a stationary device such as a desktop computer. The processing device 202 may be connected to the network 216 over a wired connection (e.g., via an Ethernet cable) and/or a wireless connection (e.g., over a WiFi network). The processing device 202 may thereby communicate with (e.g., transmit data to) the one or more servers 234 over the network 216. For further description of ultrasound devices and systems, see U.S. patent application Ser. No. 15/415,434 titled "UNIVERSAL ULTRASOUND DEVICE AND RELATED APPARATUS AND METHODS," filed on Jan. 25, 2017 and published as U.S. Pat. App. Publication No. 2017-0360397 A1 (and assigned to the assignee of the instant application), which is incorporated by reference herein in its entirety.

FIG. 2 should be understood to be non-limiting. For example, the ultrasound system 200 may include fewer or more components than shown and the processing device 202 and ultrasound device 206 may include fewer or more components than shown. In some embodiments, the processing device 202 may be part of the ultrasound device 206.

Various aspects of the present disclosure may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Various inventive concepts may be embodied as one or more processes, of which an example has been provided. The acts performed as part of each process may be ordered in any suitable way. Thus, embodiments may be constructed in which acts are performed in an order different than illustrated, which may include performing some acts simultaneously, even though shown as sequential acts in illustrative embodiments. Further, one or more of the processes may be combined and/or omitted, and one or more of the processes may include additional steps.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, reference to a numerical value being between two endpoints should be understood to encompass the situation in which the numerical value can assume either of the endpoints. For example, stating that a characteristic has a value between A and B, or between approximately A and B, should be understood to mean that the indicated range is inclusive of the endpoints A and B unless otherwise noted.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be object of this disclosure. Accordingly, the foregoing description and drawings are by way of example only.

What is claimed is:

1. An apparatus, comprising:
   a processing device in operative communication with an ultrasound device, the processing device configured to:
   receive ultrasound data from the ultrasound device;
   generate ultrasound images from the ultrasound data;
   take one or more measurements of ultrasound imaging frame rate based on the generation of the ultrasound images;
   compare at least a first measurement of ultrasound imaging frame rate of the one or more measurements of ultrasound imaging frame rate to a reference ultrasound imaging frame rate value; and
   based on a result of comparing at least the first measurement of ultrasound imaging frame rate of the one or more measurements of ultrasound imaging frame rate to a reference ultrasound imaging frame rate value, provide a notification and/or disable an ultrasound imaging preset and/or an ultrasound imaging mode with which the ultrasound device was configured during collection of the ultrasound data,
   wherein the processing device is configured, when comparing at least the first measurement of ultrasound imaging frame rate of the one or more measurements of ultrasound imaging frame rate to the reference ultrasound imaging frame rate value, to determine if an average of the one or more measurements of frame rate is less than the reference frame rate value by a threshold amount.

2. The apparatus of claim 1, wherein the processing device comprises a smartphone.

3. The apparatus of claim 1, wherein the processing device comprises a tablet.

4. The apparatus of claim 1, wherein the processing device is configured, when taking the one or more measurements of ultrasound imaging frame rate based on the generation of the ultrasound images, to determine how many ultrasound images the processing device generated during a time period.

5. The apparatus of claim 1, wherein the processing device is configured, when taking the one or more measurements of ultrasound imaging frame rate based on the generation of the ultrasound images, to determine how many ultrasound images the processing device generated during multiple time periods.

6. The apparatus of claim 5, wherein the multiple time periods are successive.

7. The apparatus of claim 5, wherein the multiple time periods are overlapping.

8. The apparatus of claim 5, wherein the multiple time periods are not consecutive.

9. The apparatus of claim 5, wherein the multiple time periods have different lengths.

10. The apparatus of claim 5, wherein the multiple time periods have the same lengths.

11. The apparatus of claim 1, wherein the reference frame rate value is based at least in part on the ultrasound imaging preset and/or the ultrasound imaging mode with which the ultrasound device is configured.

12. The apparatus of claim 1, wherein the reference frame rate value is based at least in part on ultrasound wave transmission timings and/or processing times of processing circuitry in the ultrasound device.

13. The apparatus of claim 1, wherein the threshold amount is based at least in part on the ultrasound imaging preset and/or the ultrasound imaging mode with which the ultrasound device is configured.

14. The apparatus of claim 13, wherein the notification includes a notification that imaging performance is degraded.

15. The apparatus of claim 14, wherein the notification includes a notification that the processing device does not support the ultrasound device's peak performance capability.

16. The apparatus of claim 1, wherein the notification includes a notification that a user may experience degrade imaging frame rate and certain imaging modes may be disabled.

17. The apparatus of claim 1, wherein the notification includes a notification that a user should contact customer support.

18. The apparatus of claim 1, wherein the notification includes a notification that imaging performance degradation is due to the ultrasound device and not the processing device.

19. An apparatus, comprising:
   a processing device in operative communication with an ultrasound device, the processing device configured to:

receive ultrasound data from the ultrasound device;
generate ultrasound images from the ultrasound data;
take one or more measurements of ultrasound imaging frame rate based on the generation of the ultrasound images;
compare at least a first measurement of ultrasound imaging frame rate of the one or more measurements of ultrasound imaging frame rate to a reference ultrasound imaging frame rate value; and
based on a result of comparing at least the first measurement of ultrasound imaging frame rate of the one or more measurements of ultrasound imaging frame rate to a reference ultrasound imaging frame rate value, provide a notification and/or disable an ultrasound imaging preset and/or an ultrasound imaging mode with which the ultrasound device was configured during collection of the ultrasound data,
wherein the processing device is configured, when comparing at least the first measurement of ultrasound imaging frame rate of the one or more measurements of ultrasound imaging frame rate to the reference ultrasound imaging frame rate value, to determine if at least one of the measurements of frame rate is less than the reference frame rate value by a threshold amount.

20. An apparatus, comprising:
a processing device in operative communication with an ultrasound device, the processing device configured to:
receive ultrasound data from the ultrasound device;
generate ultrasound images from the ultrasound data;
take one or more measurements of ultrasound imaging frame rate based on the generation of the ultrasound images;
compare at least a first measurement of ultrasound imaging frame rate of the one or more measurements of ultrasound imaging frame rate to a reference ultrasound imaging frame rate value; and
based on a result of comparing at least the first measurement of ultrasound imaging frame rate of the one or more measurements of ultrasound imaging frame rate to a reference ultrasound imaging frame rate value, provide a notification and/or disable an ultrasound imaging preset and/or an ultrasound imaging mode with which the ultrasound device was configured during collection of the ultrasound data,
wherein the processing device is configured, when comparing at least the first measurement of ultrasound imaging frame rate of the one or more measurements of ultrasound imaging frame rate to the reference ultrasound imaging frame rate value, to determine if at least a specific portion of a specific number of consecutive measurements of frame rate are less than the reference frame rate value by a threshold amount.

\* \* \* \* \*